US 9,306,841 B2
Apr. 5, 2016

(12) United States Patent
Vasseur et al.

(10) Patent No.: US 9,306,841 B2
(45) Date of Patent: Apr. 5, 2016

(54) ENABLING DYNAMIC ROUTING TOPOLOGIES IN SUPPORT OF REAL-TIME DELAY TRAFFIC

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 13/668,904

(22) Filed: Nov. 5, 2012

(65) Prior Publication Data

US 2014/0126423 A1 May 8, 2014

(51) Int. Cl.
*H04L 12/28* (2006.01)
*H04L 12/753* (2013.01)
*H04W 40/24* (2009.01)
*H04L 12/751* (2013.01)

(52) U.S. Cl.
CPC ............... *H04L 45/48* (2013.01); *H04L 45/02* (2013.01); *H04W 40/24* (2013.01)

(58) Field of Classification Search
CPC ......... H04L 41/12; H04L 29/00; H04L 45/54; H04L 61/00; H04L 69/08; H04L 12/28
USPC ........................................................ 370/255
See application file for complete search history.

(56) References Cited

U.S. PATENT DOCUMENTS

| 7,522,603 | B2 | 4/2009 | Vasseur |
| 7,542,414 | B1 | 6/2009 | Katukam |
| 7,668,971 | B2 | 2/2010 | Vasseur et al. |
| 7,978,725 | B2 | 7/2011 | Gong et al. |
| 7,995,461 | B2 | 8/2011 | Vasseur et al. |
| 8,023,504 | B2 | 9/2011 | Shah et al. |
| 8,072,879 | B2 | 12/2011 | Vasseur et al. |
| 8,264,962 | B2 | 9/2012 | Vasseur et al. |
| 2004/0255050 | A1* | 12/2004 | Takehiro ............... H04L 45/00 709/252 |
| 2006/0215577 | A1 | 9/2006 | Guichard et al. |
| 2009/0198832 | A1 | 8/2009 | Shah et al. |
| 2010/0146149 | A1 | 6/2010 | Vasseur et al. |

(Continued)

OTHER PUBLICATIONS

Goyal, et al., "Reactive Discovery of Point-to-Point Routes in Low Power and Lossy Networks", draft-ietf-roll-p2p-rpl-14, Oct. 2012, 36 pages, Internet Engineering Task Force Trust.

(Continued)

*Primary Examiner* — Wei Zhao
*Assistant Examiner* — Abdeltif Ajid
(74) *Attorney, Agent, or Firm* — Parker Ibrahim & Berg LLC; James M. Behmke; Stephen D. LeBarron

(57) ABSTRACT

In one embodiment, a device determines a set of sources and used destinations for traffic in a computer network, where nodes of the network are configured to send all traffic to the used destinations through a root node of the computer network according to a directed acyclic graph (DAG). The device may then also determine a set of capable nodes as common ancestors to source-destination pairs that provide a more optimal path between the source-destination pairs than traversing the root node, and instructs the set of capable nodes to store downward routes to forward traffic for one or more of the used destinations according to the stored downward route rather than through the root node.

23 Claims, 13 Drawing Sheets

(56) References Cited

U.S. PATENT DOCUMENTS

| | | | |
|---|---|---|---|
| 2011/0116389 A1* | 5/2011 | Tao | H04L 45/18 370/252 |
| 2011/0231573 A1* | 9/2011 | Vasseur | H04L 45/124 709/238 |
| 2012/0044801 A1 | 2/2012 | Vasseur et al. | |
| 2012/0099587 A1* | 4/2012 | Fan et al. | 370/389 |
| 2013/0208583 A1* | 8/2013 | Guo et al. | 370/225 |
| 2013/0308444 A1* | 11/2013 | Sem-Jacobsen et al. | 370/230 |

OTHER PUBLICATIONS

Goyal, et al., "A Mechanism to Measure the Quality of a Point-to-point Route in a Low Power and Lossy Network," draft-ietf-roll-p2p-measurement-06, Mar. 2013, 20 pages, Internet Engineering Task Force Trust.

Lampreia, et al., "Notification of Transmittal of the International Search Report and the Written Opinion of the International Searching Authority, or the Declaration", Patent Cooperation Treaty, International Application No. PCT/US2013/067428, mailed Jan. 29, 2014, 12 pages, European Patent Office, Rijswijk, Netherlands.

Gnawali, et al., "The Minimum Rank with Hysteresis Objective Function", Request for Comments 6719, Sep. 2012, 13 pages, Internet Engineering Task Force Trust.

Thubert, P., "Objective Function Zero for the Routing Protocol for Low-Power and Lossy Networks (RPL)", Request for Comments 6552, Mar. 2012, 14 pages, Internet Engineering Task Force Trust.

Vasseur, et al., "Routing Metrics Used for Path Calculation in Low-Power and Lossy Networks", Request for Comments 6551, Mar. 2012, 30 pages, Internet Engineering Task Force Trust.

Winter; et al., "RPL: IPv6 Routing Protocol for Low-Power and Lossy Networks", Request for Comments 6550, Mar. 2012, 157 pages, Internet Engineering Task Force Trust.

* cited by examiner

ENABLING DYNAMIC ROUTING TOPOLOGIES IN SUPPORT OF REAL-TIME DELAY TRAFFIC

TECHNICAL FIELD

The present disclosure relates generally to computer networks, and, more particularly, to routing topology configuration in computer networks.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

RPL supports two modes of operation for maintaining and using Downward routes:
1) Storing Mode: where routers unicast control messages directly to their DAG parents. In turn, RPL routers maintain reachable IPv6 addresses for each of their DAG Children in their routing table. Because intermediate RPL routers store Downward routing state, this mode is called Storing mode.
2) Non-Storing Mode: RPL routers unicast control messages directly to the DAG Root. The control messages also include the IPv6 addresses for the source's DAG Parents. By receiving control messages from each RPL router in the network, the DAG Root obtains information about the DAG topology and can use source routing to deliver datagrams. Unlike Storing mode, intermediate RPL routers in Non-Storing mode do not maintain any Downward routes.

In most networks deployed today, the mode of operation of choice is non-storing for a number of reasons, such as the absence of routing states on intermediates nodes in the network. Originally, deployments started with delay-tolerant communication and centralized collection or sourcing of data, such as meter networks. However, other network configurations, such as Distributed Automation which requires gateways in the mesh, lead to a new set of requirements and traffic matrices. For instance, not only do nodes need to communicate with each other, but paths in the mesh are required to support bounded delays (e.g., 40 ms).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
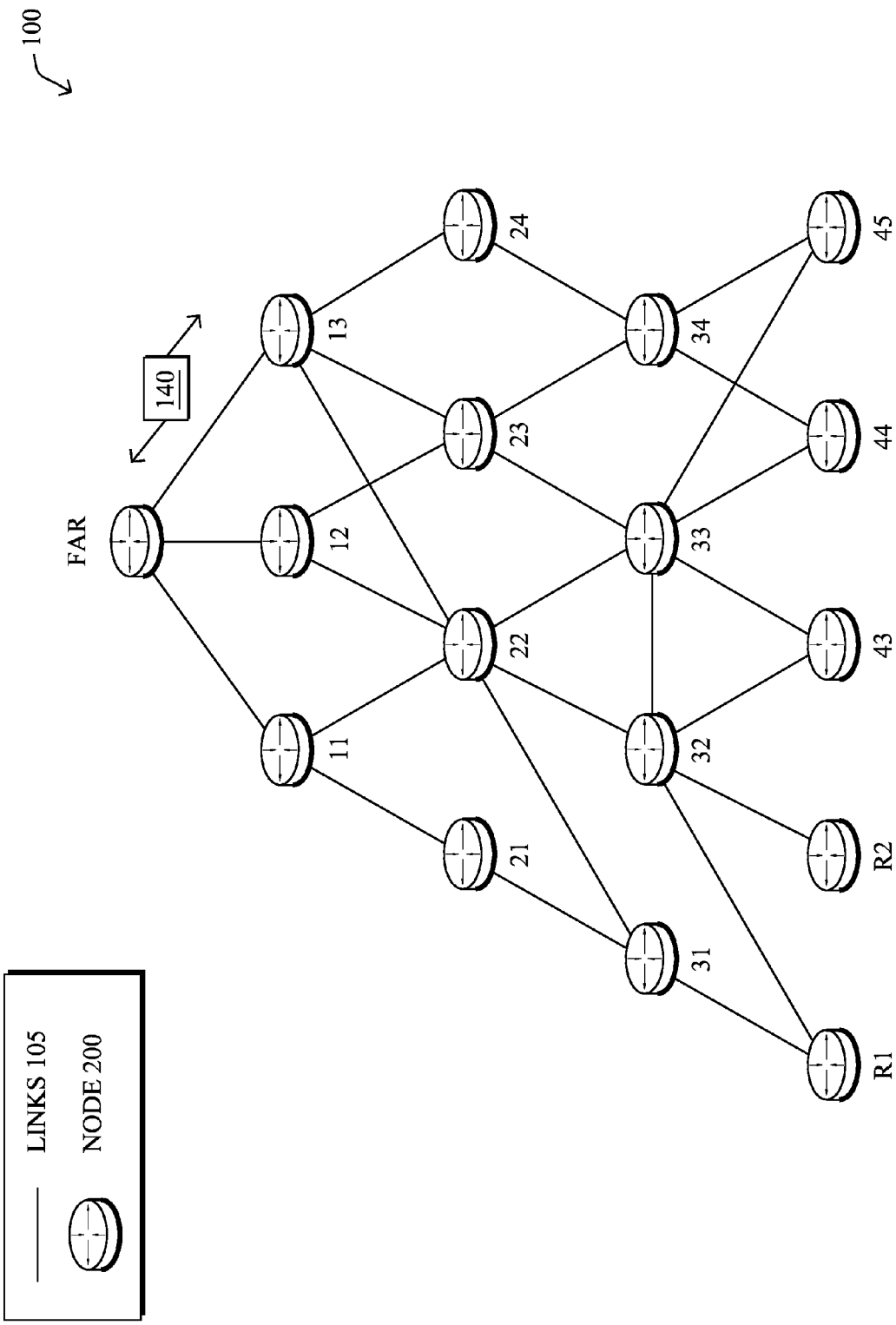
FIG. 1 illustrates an example communication network.

According to one or more embodiments of the disclosure, a device determines a set of sources and used destinations for traffic in a computer network, where nodes of the network are configured to send all traffic to the used destinations through a root node of the computer network according to a directed acyclic graph (DAG). The device may then also determine a set of capable nodes as common ancestors to source-destination pairs that provide a more optimal path between the source-destination pairs than traversing the root node, and instructs the set of capable nodes to store downward routes to forward traffic for one or more of the used destinations according to the stored downward route rather than through the root node.

According to one or more additional embodiments of the disclosure, a node operates in non-storing mode in a DAG where all traffic is sent through a root node according to the DAG, though indicates a capability to operate in storing mode. As such, the node may receive instructions to operate in storing mode to store downward routes to forward traffic for one or more particular destinations according to the stored downward route rather than through the root node of the DAG. If so, then in response to receiving traffic for a specific destination of the particular destinations, the node then uses a corresponding stored downward route to forward the traffic toward the specific destination.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "FAR" (field area router or root), "11," "12,"... "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
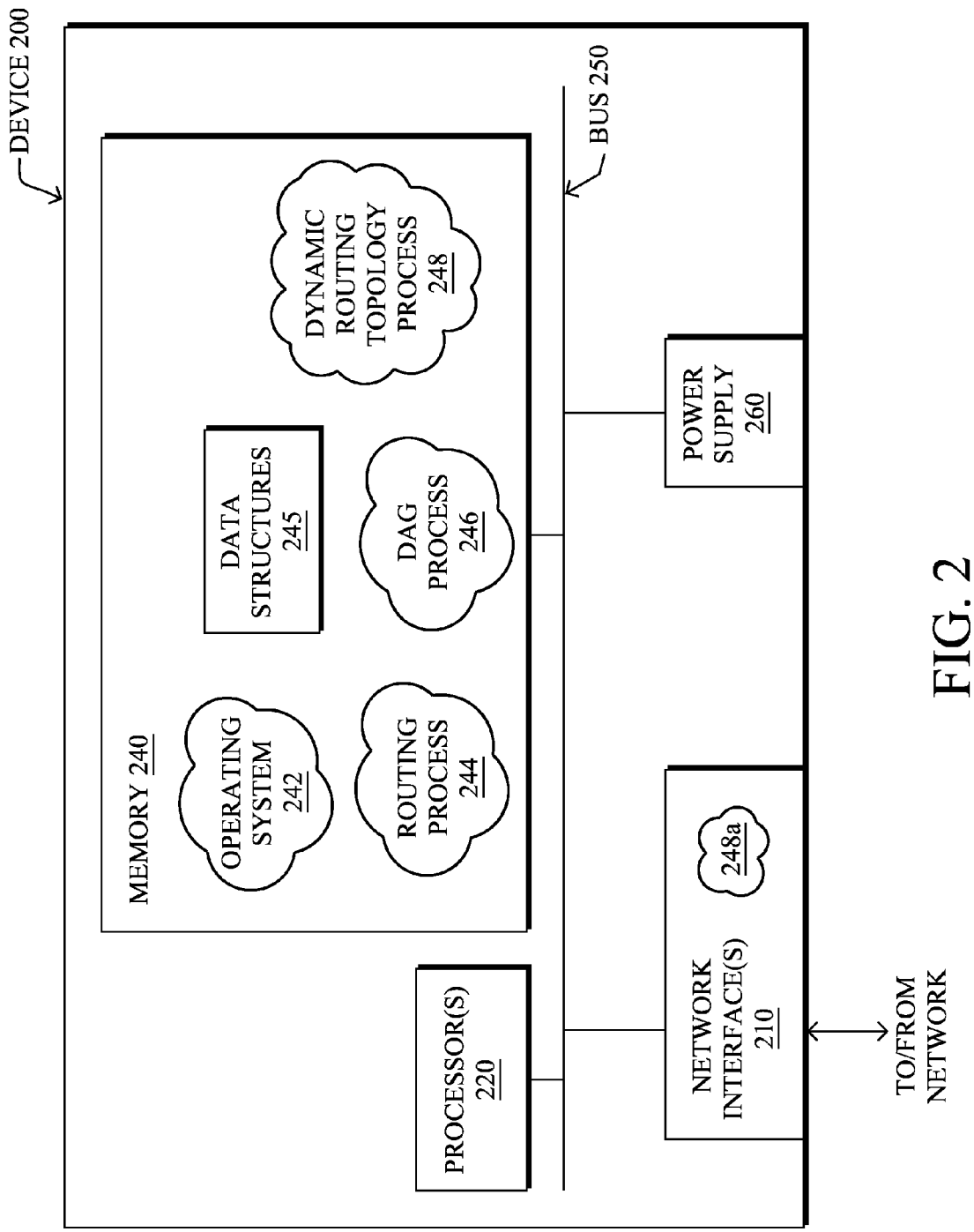
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative dynamic routing topology process 248, as described herein. Note that while dynamic routing topology process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF RFC, entitled "Routing Metrics used for Path Calculation in Low Power and Lossy Networks" <RFC 6551> by Vasseur, et al. (March 2012 version). Further, an example OF (e.g., a default OF) may be found in an IETF RFC, entitled "RPL Objective Function 0" <RFC 6552> by Thubert (March 2012 version) and "The Minimum Rank Objective Function with Hysteresis" <RFC 6719> by O. Gnawali et al. (September 2012 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
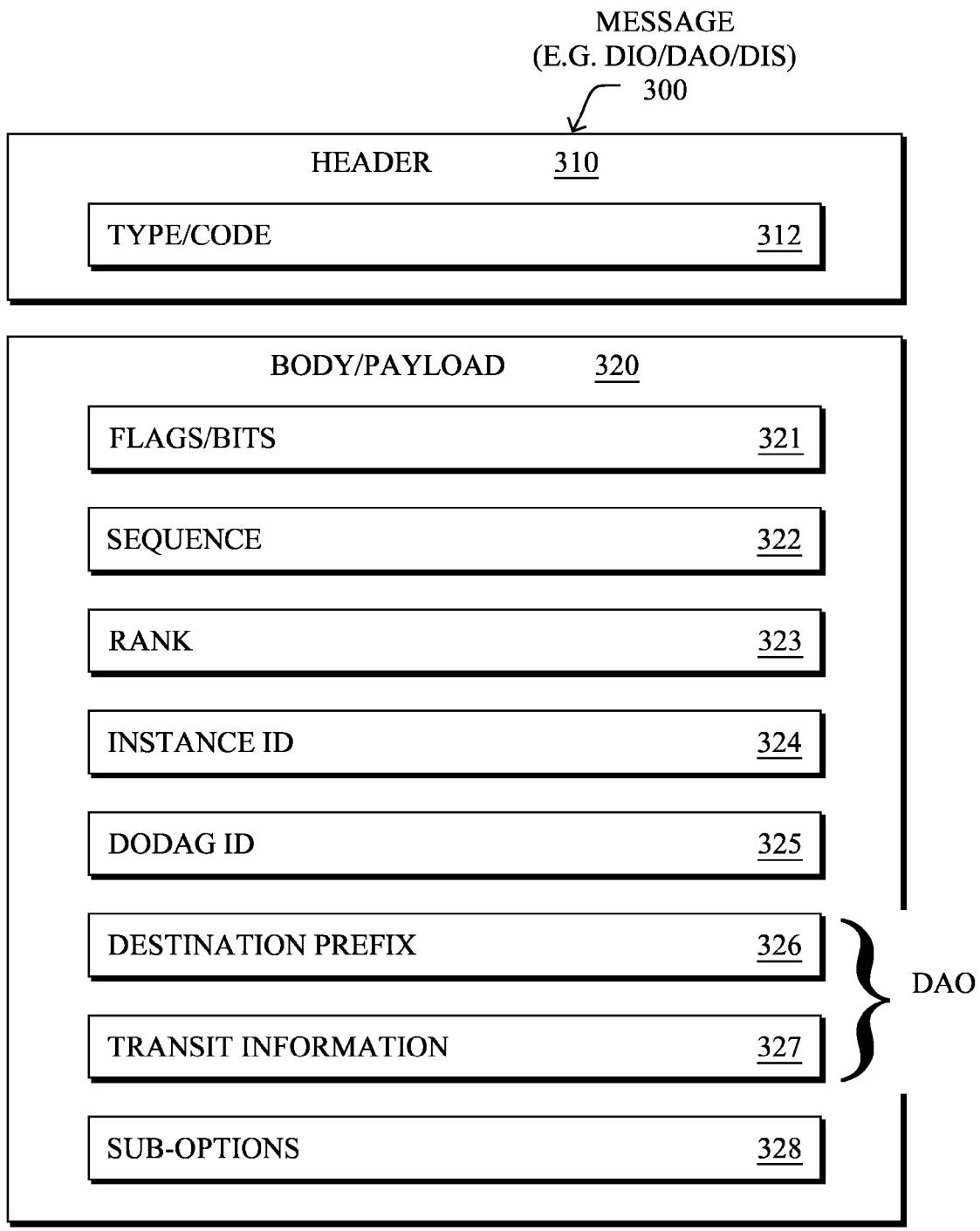
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4:
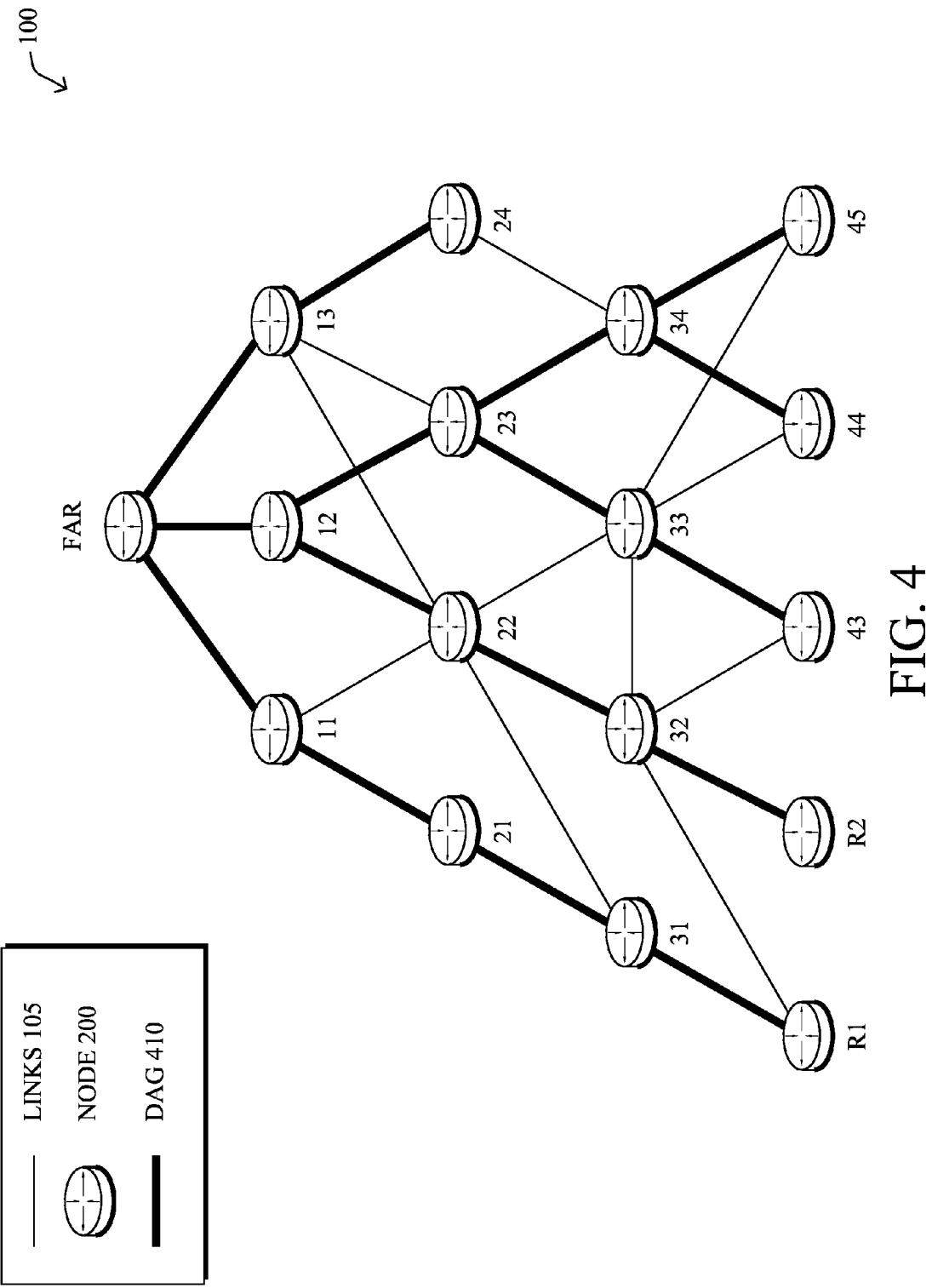
FIG. 4 illustrates an example directed acyclic graph (DAG) in the communication network in FIG. 1.

FIG. 4 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node toward one or more leaf nodes (nodes without children). Traffic/packets 140 (shown in FIG. 1) may then traverse the DAG 410 in either the upward direction toward the root or downward toward the leaf nodes, particularly as described herein.

As noted above, RPL supports two modes of operation for maintaining and using Downward routes, Storing Mode and Non-Storing Mode. In most networks deployed today, the mode of operation of choice is non-storing for a number of reasons, such as the absence of routing states on intermediates nodes in the network. However, certain networks, though desiring to benefit from non-storing mode, have instances where certain specific nodes are required to communicate with each other, and with bounded delays (e.g., 40 ms). In particular, the latency requirements may not always be satisfied by Non-Storing Mode, since it generally requires all paths to traverse the DAG Root, such as the traffic paths shown in FIG. 5, thus occasionally leading to long paths that do not satisfy the delay requirements.

Enabling Dynamic Routing Topologies

The techniques herein analyze traffic in a network (e.g., according to dynamic discovery) to determine where modifying the behavior of some nodes to enable storing mode, and inform certain other nodes to change their routing table to forward specific (e.g., critical) traffic toward those storing-enabled nodes in order to satisfy tight delay requirements (e.g., service level agreements or "SLAs") for the specific traffic. In particular, the techniques herein may first determine a set of nodes exchanging critical data (e.g., delay sensitive, such as in support of distribution protection) using on-line traffic matrix monitoring or dynamic community discovery). The techniques herein then allow for preservation of the scalable non-storing mode of operation of a routing topology (DAG) computed using a distributed algorithm for non-critical traffic, while enabling a central computation engine to modify the routing mode of operation in specific locations in order to provide paths that satisfy the required constraints (e.g., delay, hop count, etc.).

Specifically, according to one or more embodiments of the disclosure as described in detail below, a device determines a set of sources and used destinations for traffic in a computer network, where nodes of the network are configured to send all traffic to the used destinations through a root node of the computer network according to a directed acyclic graph (DAG). The device may then also determine a set of capable nodes as common ancestors to source-destination pairs that provide a more optimal path between the source-destination pairs than traversing the root node, and instructs the set of capable nodes to store downward routes to forward traffic for one or more of the used destinations according to the stored downward route rather than through the root node.

Illustratively, the techniques described herein may be performed by hardware, software, and/or firmware, such as in accordance with the dynamic routing topology process 248/248a, which may contain computer executable instructions executed by the processor 220 (or independent processor of interfaces 210) to perform functions relating to the techniques described herein, e.g., in conjunction with (or as a part of) routing process 244 (and/or DAG process 246). For example, the techniques herein may be treated as extensions to conventional protocols, such as the various routing protocols (e.g., RPL), and as such, may be processed by similar components understood in the art that execute those protocols, accordingly.

Operationally, traffic matrix analysis may be used to know the traffic between each pair of routers in the network, e.g., recording the average/min/max traffic for a given traffic class. While RPL (and other illustrative DAG protocols) in non-storing mode requires all traffic to transit the DAG Root, the benefit is that the DAG Root can observe the kind of traffic that nodes are sending through the network. To that end, the techniques herein may use deep packet inspection (DPI) on the DAG root (e.g., Field Area Router). Note that the techniques herein may be specifically meant to perform dynamic DAG root adaptation according to traffic requirements, the DAG root may be configured to only record traffic of specific types (e.g., "critical" traffic) according to local policy (e.g., traffic marked with a specific DSCP, packets destined to specific UDP or TCP ports, traffic from specific sources or destinations, etc.).

Figure 5:
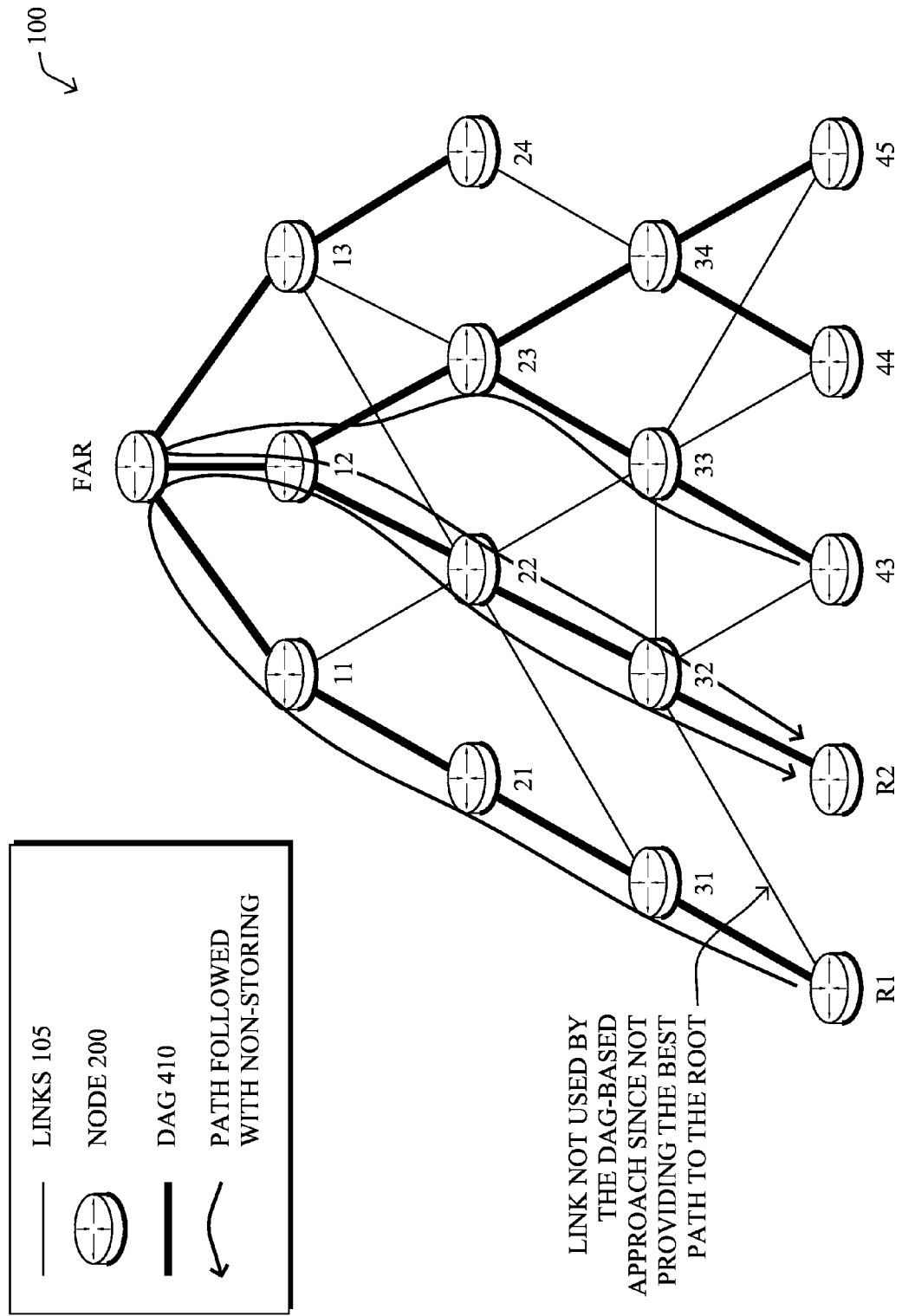
FIG. 5 illustrates an example view of traffic sent along the DAG.
Figure 6:
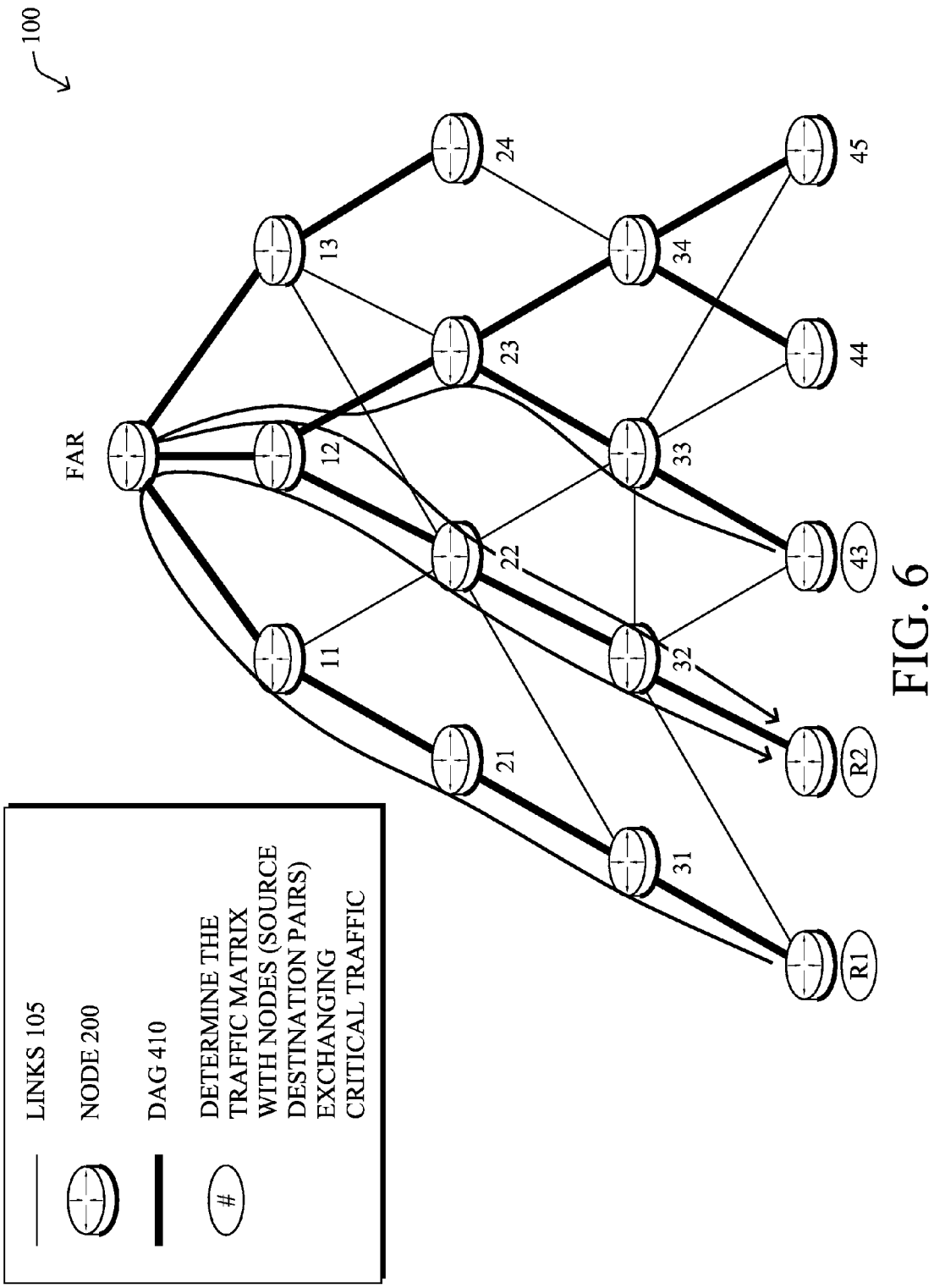
FIG. 6 illustrates an example view of source-destination pairs.

This allows for recording a subset of traffic of interest for the overall traffic matrix: the traffic matrix TM' between nodes sending traffic requiring strict SLA (e.g., overall delay of 40 ms), such as the two flows shown in FIG. 5. (Note that TM' entries may be potentially filtered out according to various parameters such as the amount of traffic, etc.) From these "critical" flows of traffic, source-destination pairs (e.g., R1-R2 and 43-R2), or more generally, the nodes engaging in critical traffic, may be determined, as illustrated in FIG. 6.

Alternatively (or in addition), an explicit notification may be sent to the DAG root (or other management node performing the techniques herein) regarding source-destination pairs within the network, particularly for critical traffic as noted. For instance, in one embodiment, the set of nodes potentially sending traffic to each other may be dynamically discovered in a pro-active fashion. Instead of relying on traffic transiting through the DAG root, such nodes (e.g., nodes R1 and 43) may list the set of destinations (e.g., R2) to which they expect to send critical traffic (such a list may be encoded in the DAO messages reported to the DAG root, using an uncompressed list of addresses or a compressed form). For the sake of illustration, if a set of Distribution Automation devices in a localized area require short delay path for distribution protection, each element of the set may list the other element. Alternatively, each group of communicating elements may use a dynamic tag (e.g., computed by a dynamic host configuration protocol (DHCP) server upon registration), thus avoiding control plane traffic overhead.

According to one or more embodiments herein, the nodes in the network that should enable storing mode is next determined. In one embodiment, a flag S may be added in a TLV to the DAO messages that indicates whether the node is capable of acting as a storing device. In another embodiment, a Node-Capacity field may be added that indicates amount of memory and/or other resources the node has available to store routes. Note that because RPL is configured for Non-Storing mode, these "capable" nodes do not maintain any downward routes by default. Instead, the DAG Root (or other management device) must explicitly notify the nodes what destinations (e.g., and types of traffic) for which downward routes are to be maintained.

Figure 7:
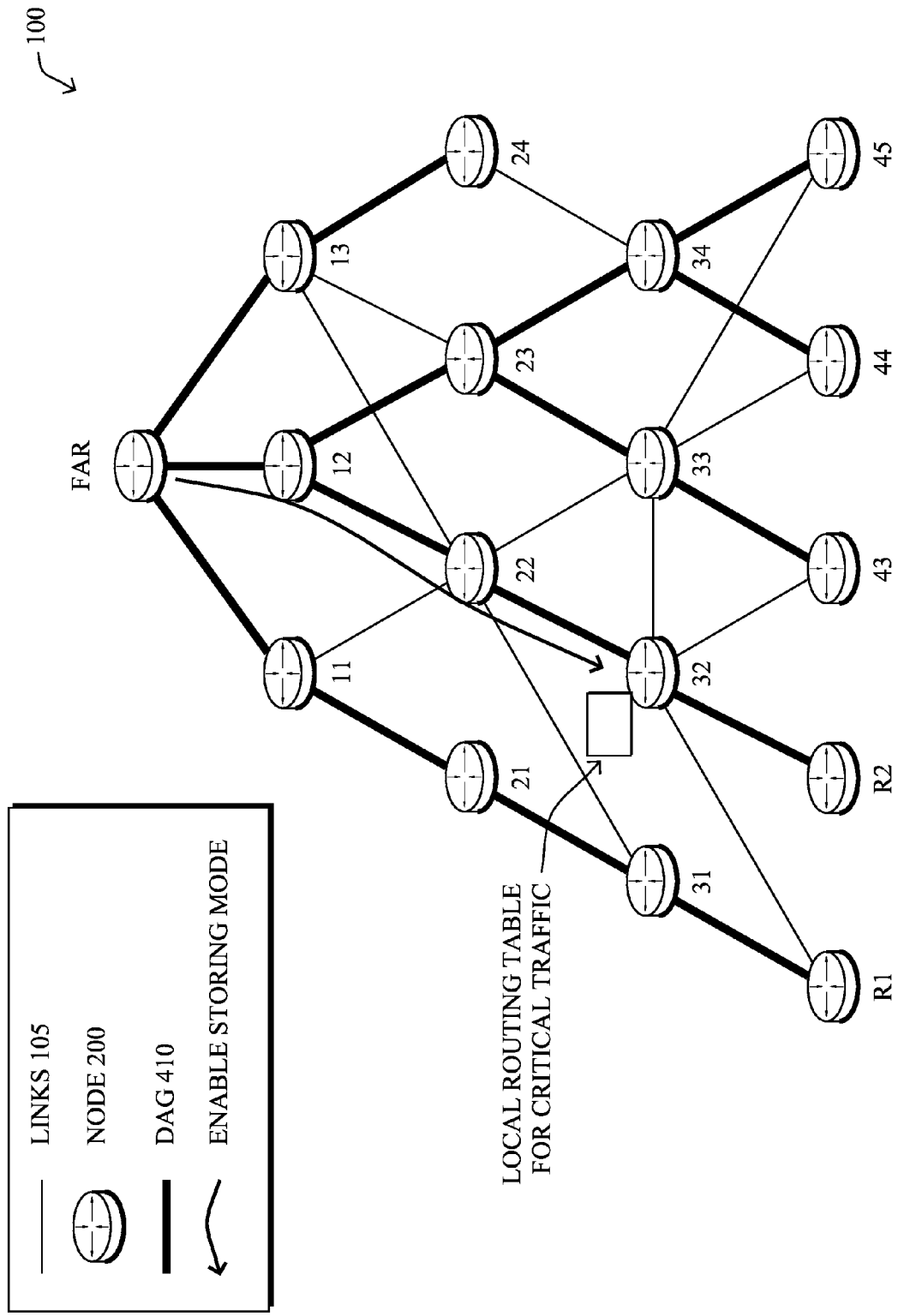
FIG. 7 illustrates an example view of enabling storing mode.

Using the new information carried in the DAO, the DAG Root can then discover what nodes are capable of storing downward routes. With a view of the storing-capable nodes, the DAG Root can then determine if any capable nodes may be used to shorten paths between nodes sending critical traffic. In particular, the DAG Root may selects storing nodes to be the common "ancestor" of source-destination pairs for critical traffic. In an illustrative embodiment, a simple iterative algorithm may be used by the DAG root in order to determine whether storing mode on certain nodes allows those nodes to make use of a path satisfying the delay requirements. (The complexity of such an algorithm is as low as n Log(n), with n being the number of nodes.) As shown in FIG. 7, for example, node 32 may conveniently be selected as such an ancestor node between both source-destination pair.

Figure 8:
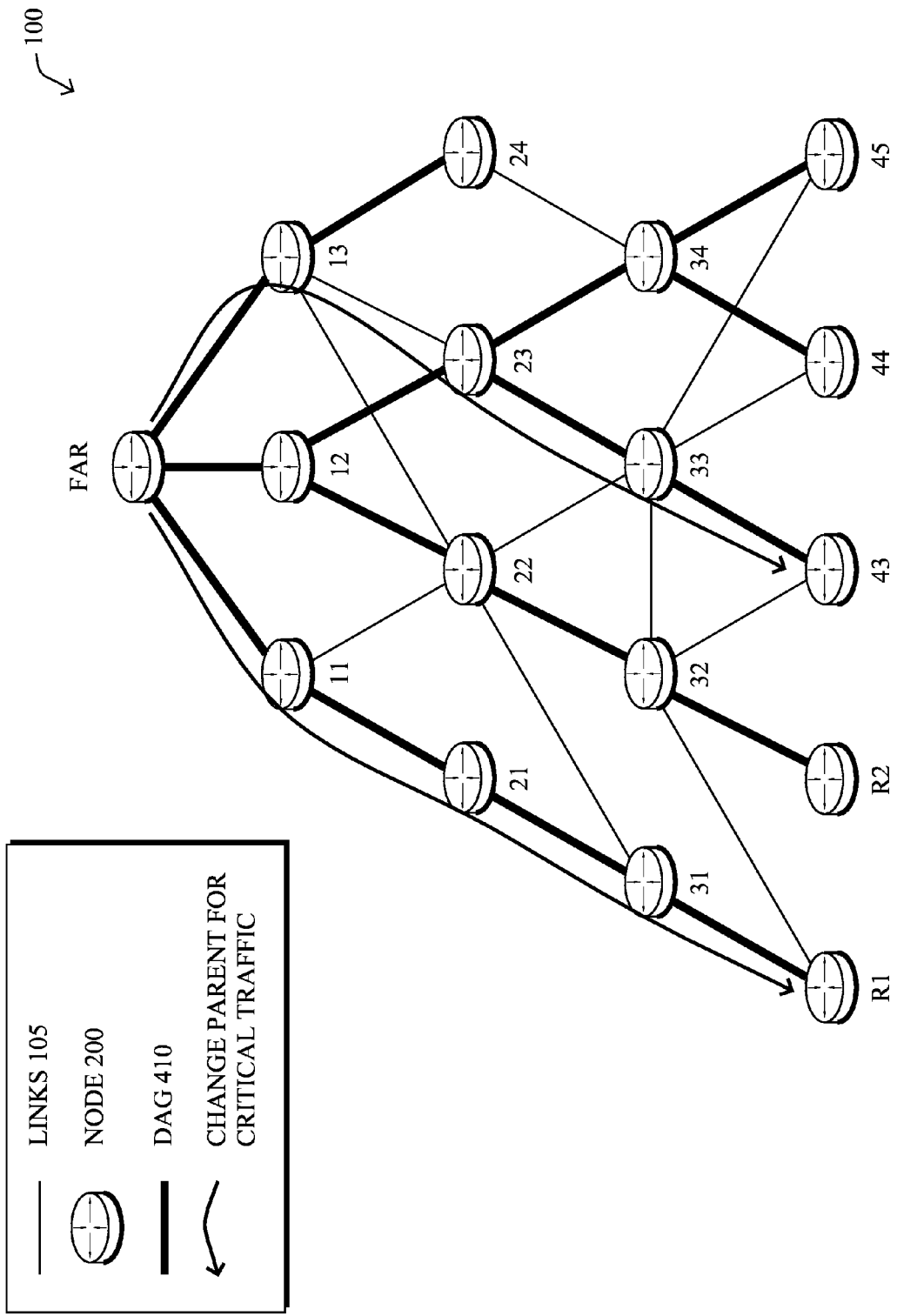
FIG. 8 illustrates an example view of changing DAG parents for critical traffic.
Figure 9:
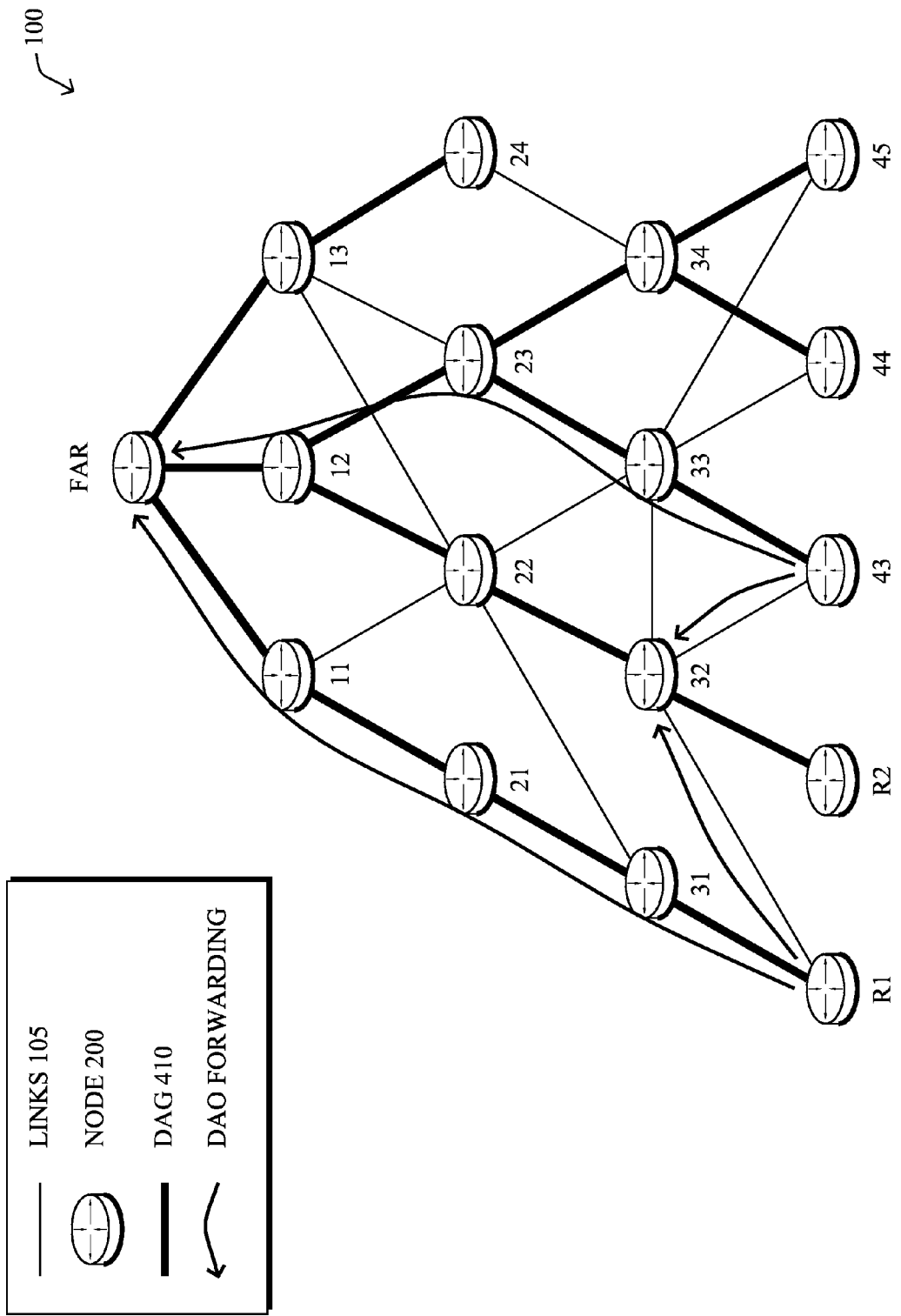
FIG. 9 illustrates an example view of routing protocol control message forwarding.

According to one or more embodiments herein, a new unicast message M is defined to notify certain nodes of the DAG to select a new parent, such as illustrated in FIG. 8. Recall that the RPL DAO messages may contain multiple parents, one of which is preferred. The DAG Root can then determine if selecting an alternate path can lead to a storing device that will create a common ancestor and shorten the path for critical traffic. Upon receiving the message M, nodes receiving such notification would modify their routing table accordingly. Note that these nodes may modify their routing tables for all traffic or only for the critical traffic, thus still routing other traffic according to the preferred parent selected by the Objective Function. Furthermore, as shown in FIG. 9, the notified node may keep sending IP unicast-routed DAOs to the DAG root, but also to the selected parent to which the critical traffic should be sent.

Figure 10:
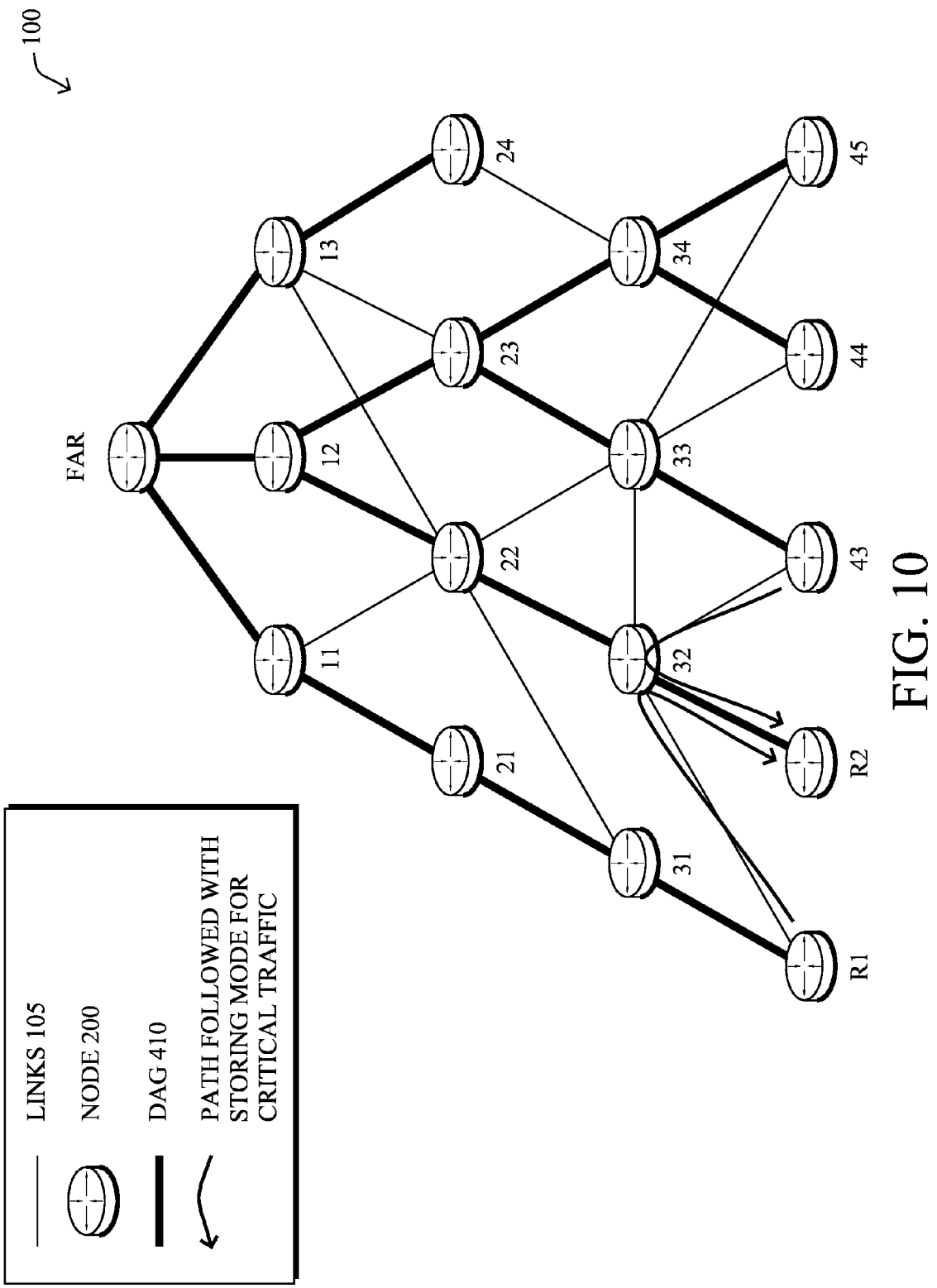
FIG. 10 illustrates an example view of traffic sent according to the enabled storing mode.
Figure 11:
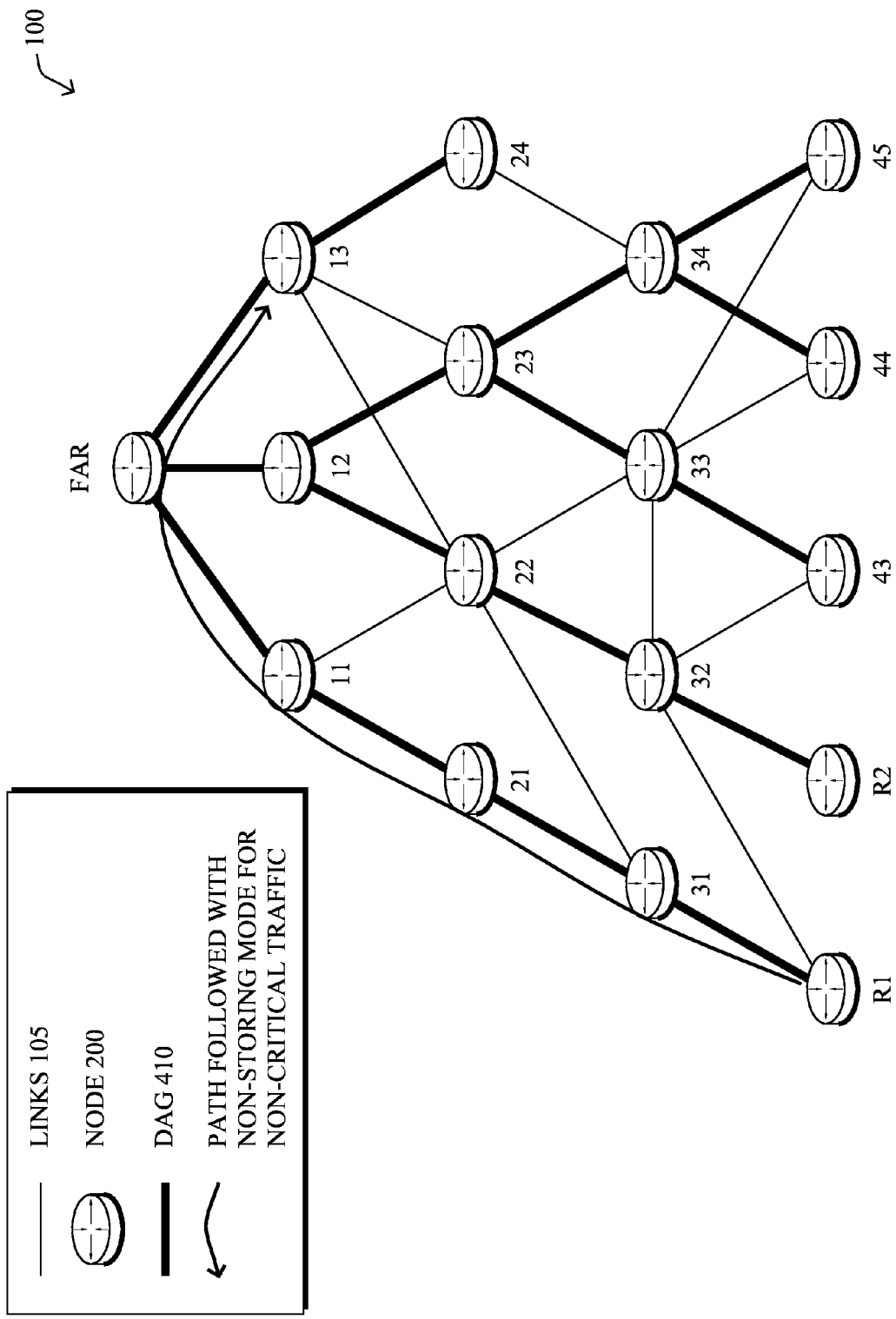
FIG. 11 illustrates an example view of traffic sent along the DAG.

Accordingly, the techniques herein result in virtual DAGs per class of service (without having to effectively signal a new DAG) with local modification of routing tables. Once the set of nodes that must start storing routing tables (making use of storing modes) has been determined, instructions are sent (e.g., unicast) to each of these nodes, potentially comprising a prefix filter. At this point, the storing node(s) would start storing routes received from DAO messages (e.g., after applying the prefix filter in order to only store routes for nodes that are sending/receiving critical traffic). For example, as shown in FIG. 10, critical traffic (e.g., of a particular type and/or to a particular destination, such as from R1 or 43 to R2) may be forwarded using the locally-enabled storing mode (e.g., via node 32), while as shown in FIG. 11, non-critical traffic (e.g., from R1 to node 13) may be forwarded according to conventional DAG routing (i.e., through the root node).

Notably, should a node that was selected for storing mode to effectively modify the routing topology for critical traffic become unable to activate routing storage (e.g., the node may run out of memory), the S flag in the TLV sent to the DAG root may be cleared and a new DAO is sent. In such a case, the DAG root may rerun the algorithm in order to determine whether an alternate storing node may be found that would be capable of storing routes in order to satisfy the SLA.

Figure 12:
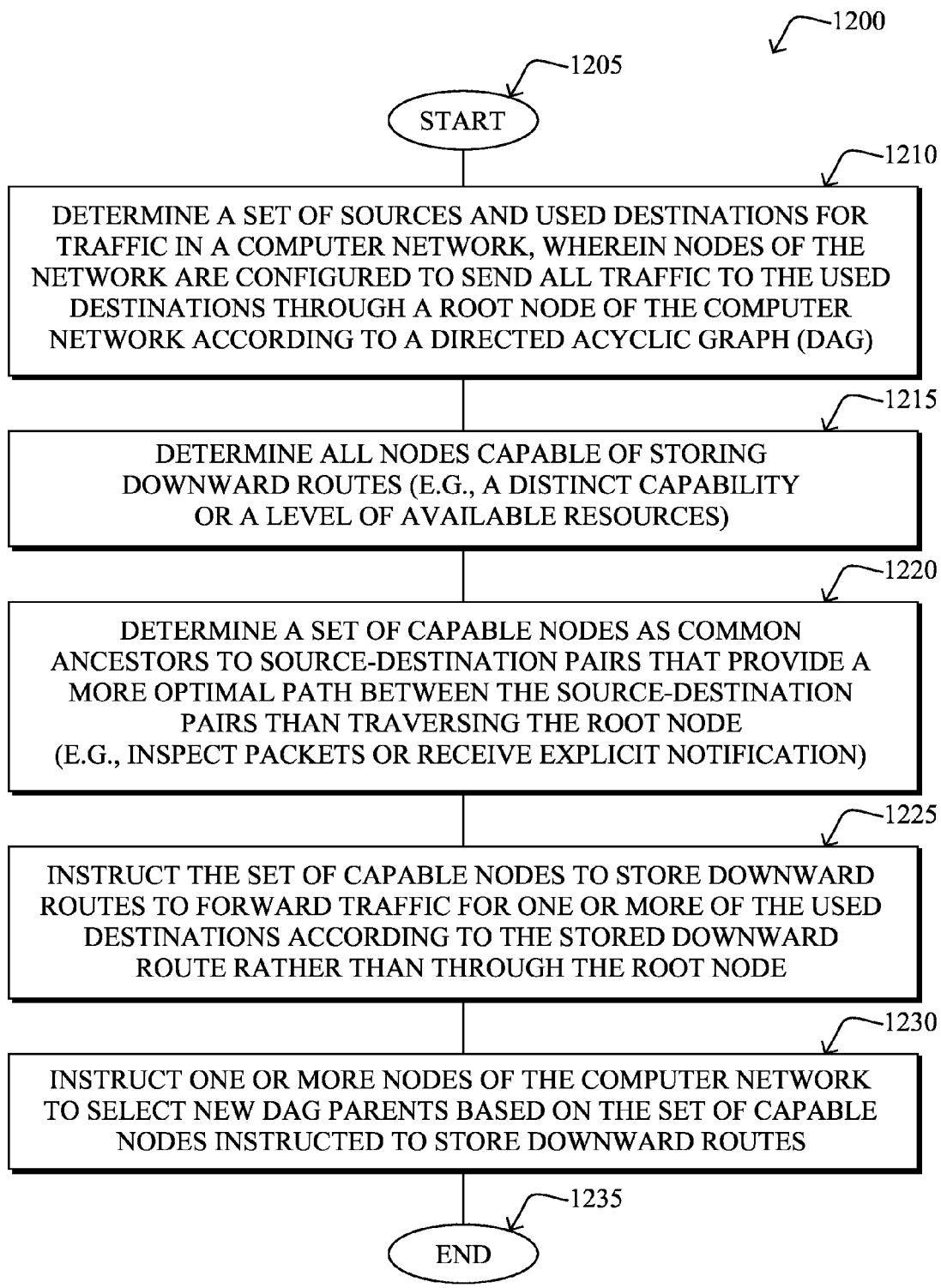
FIG. 12 illustrates an example simplified procedure for enabling of dynamic routing topologies in a shared-media communication network, particularly from the perspective of a network management device.

FIG. 12 illustrates an example simplified procedure 1200 for enabling of dynamic routing topologies in a shared-media communication network in accordance with one or more embodiments described herein, particularly from the perspective of a network management device (e.g., the FAR, root node, NMS, etc.). The procedure 1200 may start at step 1205, and continues to step 1210, where, as described in greater detail above, the management device determines a set of sources and used destinations for traffic in a computer network, where nodes of the network are configured to send all traffic to the used destinations through a root node of the computer network according to a DAG. In step 1215, the device may determine all nodes capable of storing downward routes (from which to determine the set of capable nodes as common ancestors to source-destination pairs, below), such as by determining at least one of either a distinct capability or a level of available resources of the nodes in the computer network. As such, in step 1220, the device may then determine a set of capable nodes as common ancestors to source-destination pairs that provide a more optimal path between the source-destination pairs than traversing the root node (where providing a more optimal path between the source-destination pairs than traversing the root node may generally comprise providing a path that meets a particular delay requirement). For example, the device may inspect packets received at the root node, or else may receive an explicit notification from at least one of either a source or a destination of traffic.

In step 1225, the device may instruct the set of capable nodes to store downward routes to forward traffic for one or more of the used destinations according to the stored downward route rather than through the root node. Note that in one embodiment, the traffic for which the set of sources and used destinations is determined and for which the set of capable nodes are instructed to store downward routes is a certain type of traffic only. Optionally, in step 1230, the device may also instruct one or more nodes of the computer network to select new DAG parents based on the set of capable nodes instructed to store downward routes, as noted above, where in certain embodiments these instructions are for only one or more of the used destinations and/or for critical traffic. The simplified procedure 1200 may then illustratively end in step 1235. Notably, in response to determining that a particular node of the set of capable nodes instructed to store downward routes is no longer capable, the device may determine a new set of capable nodes as common ancestors to source-destination pairs that provide a more optimal path between the source-destination pairs than traversing the root node, where the new set does not include the particular node.

Figure 13:
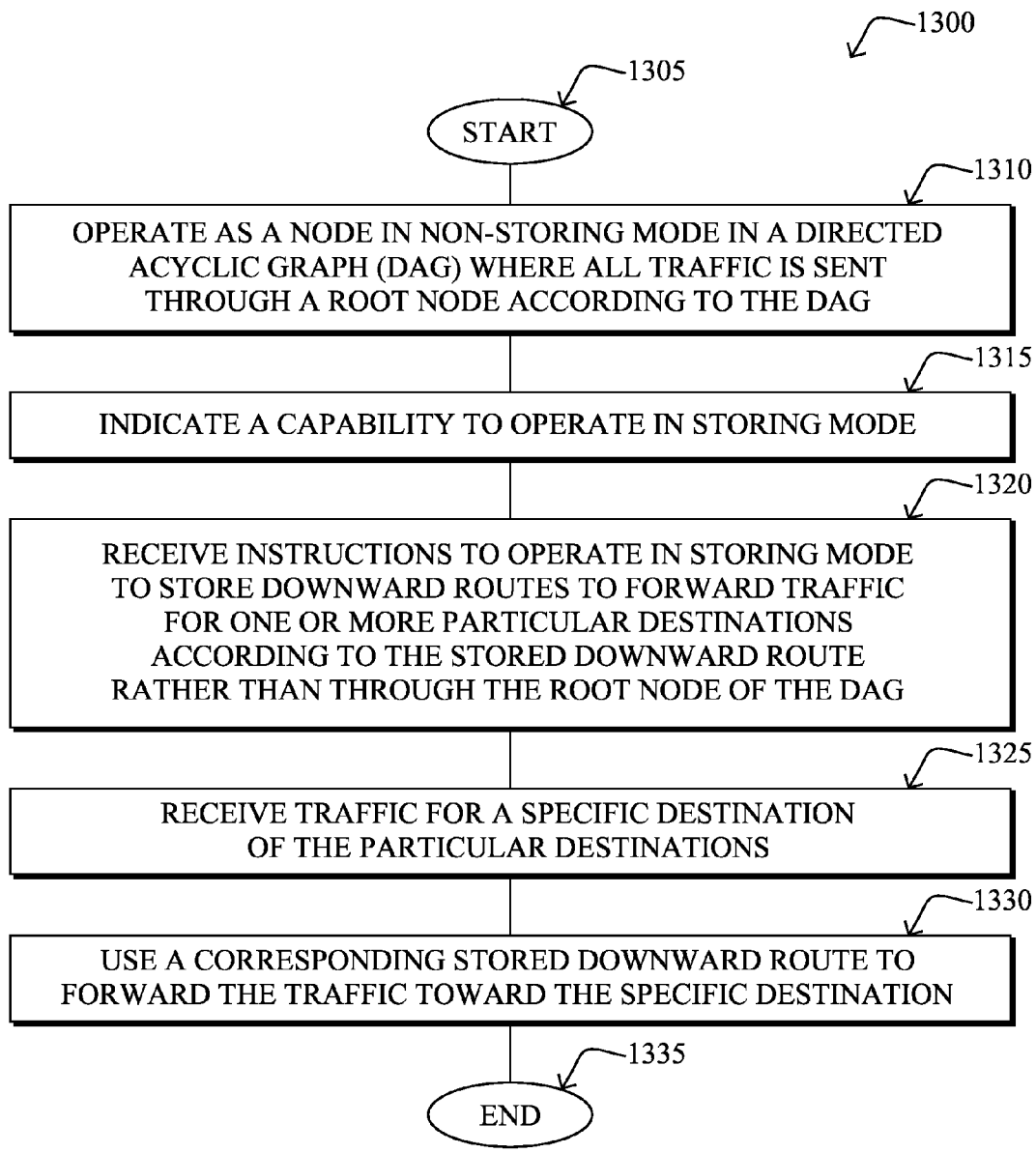
FIG. 13 illustrates another example simplified procedure for enabling of dynamic routing topologies in a shared-media communication network, particularly from the perspective of a capable node within a DAG.

In addition, FIG. 13 illustrates another example simplified procedure 1300 for enabling of dynamic routing topologies in a shared-media communication network in accordance with one or more embodiments described herein, particularly from the perspective of a capable node within a DAG. The procedure 1300 may start at step 1305, and continues to step 1310, where, as described in greater detail above, the node (e.g., node 32) operates as a node in non-storing mode in a DAG where all traffic is sent through a root node according to the DAG. In step 1315 the node may indicate a capability to operate in storing mode, such as by indicating at least one of either a distinct capability or a level of available resources of the node, and in step 1320, if so selected, may receive instructions to operate in storing mode to store downward routes to forward traffic for one or more particular destinations according to the stored downward route rather than through the root node of the DAG. Note that as discussed above, the traffic for which the node is instructed to store downward routes may be a certain type of traffic only. Accordingly, upon receiving traffic for a specific destination of the particular destinations in step 1325 (e.g., for critical traffic), then in step 1330 the node uses a corresponding stored downward route to forward the traffic toward the specific destination. The simplified procedure 1300 may then end in step 1335, e.g., for as long as the node is capable of operating in storing mode, or else for as long as the node is instructed to operate in storing mode.

It should be noted that while certain steps within procedures 1200-1300 may be optional as described above, the steps shown in FIGS. 12-13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1200-1300 are described separately, certain steps from each procedure may be incorporated into each other procedure, and the procedures are not meant to be mutually exclusive.

The techniques described herein, therefore, provide for enabling of dynamic routing topologies in a shared-media communication network. In particular, by adapting the routing topology based on analysis of an in-band traffic matrix and required SLA in LLNs, the techniques herein preserve the non-storing mode of operation used when building a DAG while only activating the storing mode where needed. In this manner, the techniques herein allow the support of critical traffic and may satisfy the path delay constraint in support of multi-service in the FAN, thus removing the disconnect between traffic flows and DAG topology. Also, contrary to today's conventional routing networks, where the physical topology is pre-determined and the routing topology is computed by a routing protocol that computes shortest (e.g., constrained) paths between pairs of nodes, the routing topology (routing adjacencies) herein is created and adapted according to the traffic matrix.

While there have been shown and described illustrative embodiments that provide for enabling of dynamic routing topologies in a shared-media communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of networks (constrained or not). In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof.

Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising: determining a set of sources and used destinations for specific traffic in a computer network, wherein nodes of the network are configured to send all traffic to the used destinations through a root node of the computer network according to a directed acyclic graph (DAG); determining a set of nodes in a non-storing mode as common ancestors to source destination pairs that provide a more optimal path between the source-destination pairs than traversing the root node, wherein determining a set of nodes includes: analyzing a traffic matrix to determine where modifying behavior of the nodes in the computer network to enable storing mode and informing certain other nodes in the computer network to change their routing table to forward the specific traffic toward the storing-enabled nodes would provide a path that meets a particular delay requirement of the specific traffic; and instructing the set of nodes to enable a storing mode and store downward routes to forward specific traffic for one or more of the used destinations according to the stored downward route rather than through the root node, wherein the downward routes are routes that lead in a direction from DAG roots towards leaf nodes.

2. The method as in claim 1, wherein determining the set of sources and the used destinations for specific traffic comprises:
inspecting packets received at the root node.

3. The method as in claim 1, wherein determining the set of sources and the used destinations for the specific traffic comprises:
receiving an explicit notification from at least one of either a source or a destination of the specific traffic.

4. The method as in claim 1, further comprising: determining all nodes of storing downward routes from which to determine the set of nodes as common ancestors to the source-destination pairs.

5. The method as in claim 4, wherein determining all nodes of storing downward routes comprises: determining at least one of either a distinct capability or a level of available resources of the nodes in the computer network.

6. The method as in claim 1, further comprising: instructing one or more nodes of the computer network to select new DAG parents based on the set of nodes instructed to store downward routes.

7. The method as in claim 6, wherein the one or more nodes of the computer network are instructed to select new DAG parents based on the set of nodes instructed to store downward routes for only one or more of the used destinations.

8. The method as in claim 1, further comprising: determining that a particular node of the set of nodes instructed to store downward routes is no longer capable; and in response, determining a new set of nodes as common ancestors to the source-destination pairs that provide a more optimal path between the source-destination pairs than traversing the root node, the new set not including the particular node.

9. The method as in claim 1, wherein the specific traffic for which the set of sources and the used destinations is determined and for which the set of nodes are instructed to store downward routes is a certain type of traffic only.

10. An apparatus, comprising: one or more network interfaces to communicate in a computer network; a processor coupled to the network interfaces and adapted to execute one or more processes; and a memory configured to store a process executable by the processor, the process when executed operable to: determine a set of sources and used destinations for specific traffic in a computer network, wherein nodes of the network are configured to send all traffic to the used destinations through a root node of the computer network according to a directed acyclic graph (DAG); determine a set of nodes in a non-storing mode as common ancestors to source-destination pairs that provide a more optimal path between the source-destination pairs than traversing the root node, wherein the determination of the set of nodes includes: analyzing a traffic matrix to determine where modifying behavior of the nodes in the computer network to enable storing mode and informing certain other nodes in the computer network to change their routing table to forward the specific traffic toward the storing-enabled nodes would provide a path that meets a particular delay requirement of the specific traffic; and instruct the set of nodes to enable a storing mode and store downward routes to forward the specific traffic for one or more of the used destinations according to the stored downward route rather than through the root node, wherein the downward routes are routes that lead in a direction from DAG roots towards leaf nodes.

11. The apparatus as in claim 10, wherein the process when executed to determine the set of sources and the used destinations for the specific traffic is further operable to:
inspect packets received at the root node.

12. The apparatus as in claim 10, wherein the process when executed to determine the set of sources and the used destinations for the specific traffic is further operable to:
receive an explicit notification from at least one of either a source or a destination of the specific traffic.

13. The apparatus as in claim 10, wherein the process when executed is further operable to: determine all nodes of storing downward routes from which to determine the set of nodes as common ancestors to the source-destination pairs.

14. The apparatus as in claim 13, wherein the process when executed to determine all nodes of storing downward routes is further operable to: determine at least one of either a distinct capability or a level of available resources of the nodes in the computer network.

15. The apparatus as in claim 10, wherein the process when executed is further operable to: instruct one or more nodes of the computer network to select new DAG parents based on the set of nodes instructed to store downward routes.

16. The apparatus as in claim 15, wherein the one or more nodes of the computer network are instructed to select new DAG parents based on the set of nodes instructed to store downward routes for only one or more of the used destinations.

17. The apparatus as in claim 10, wherein the process when executed is further operable to: determine that a particular node of the set of nodes instructed to store downward routes is no longer capable; and in response, determine a new set of nodes as common ancestors to the source-destination pairs that provide a more optimal path between the source-destination pairs than traversing the root node, the new set not including the particular node.

18. The apparatus as in claim 10, wherein the specific traffic for which the set of sources and the used destinations is determined and for which the set of nodes are instructed to store downward routes is a certain type of traffic only.

19. A method, comprising:
operating as a node in non-storing mode in a directed acyclic graph (DAG) where all traffic is sent through a root node according to the DAG;
indicating a capability to operate in storing mode;

receiving instructions to operate in storing mode to store downward routes to forward specific traffic for one or more particular destinations according to the stored downward route rather than through the root node of the DAG, wherein the downward routes are routes that lead in a direction from DAG roots towards leaf nodes, wherein the instructions to operate in a storing mode are sent based a traffic matrix analysis that determines that modifying behavior of the node to the storing mode and forwarding the specific traffic toward the storing-enabled node would provide a path that meets a particular delay requirement of the specific traffic;

receiving the specific traffic for a specific destination of the particular destinations; and, in response, using a corresponding stored downward route to forward the specific traffic toward the specific destination.

20. The method as in claim 19, wherein the specific traffic for which the node is instructed to store downward routes is a certain type of traffic only.

21. The method as in claim 19, wherein indicating the capability to operate in storing mode comprises:

indicating at least one of either a distinct capability or a level of available resources of the node.

22. An apparatus, comprising:

one or more network interfaces to communicate in a computer network;

a processor coupled to the network interfaces and adapted to execute one or more processes; and a memory configured to store a process executable by the processor, the process when executed operable to:

operate in non-storing mode in a directed acyclic graph (DAG) where all traffic is sent through a root node according to the DAG;

indicate a capability to operate in storing mode;

receive instructions to operate in storing mode to store downward routes to forward specific traffic for one or more particular destinations according to the stored downward route rather than through the root node of the DAG, wherein the downward routes are routes that lead in a direction from DAG roots towards leaf nodes, wherein the instructions to operate in a storing mode are sent based a traffic matrix analysis that determines that modifying behavior of the node to the storing mode and forwarding the specific traffic toward the storing-enabled node would provide a path that meets a particular delay requirement of the specific traffic;

receive the specific traffic for a specific destination of the particular destinations; and, in response, use a corresponding stored downward route to forward the specific traffic toward the specific destination.

23. The apparatus as in claim 22, wherein the specific traffic for which the apparatus is instructed to store downward routes is a certain type of traffic only.

\* \* \* \* \*